(12) United States Patent
Asakawa

(10) Patent No.: US 9,176,343 B2
(45) Date of Patent: Nov. 3, 2015

(54) LIQUID CRYSTAL DISPLAY APPARATUS

(71) Applicant: Japan Display Inc., Minato-ku (JP)

(72) Inventor: Youichi Asakawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 3 days.

(21) Appl. No.: 14/175,407

(22) Filed: Feb. 7, 2014

(65) Prior Publication Data

US 2014/0226114 A1 Aug. 14, 2014

(30) Foreign Application Priority Data

Feb. 12, 2013 (JP) .................................. 2013-024336

(51) Int. Cl.
| | |
|---|---|
| *G02F 1/1337* | (2006.01) |
| *B32B 5/14* | (2006.01) |
| *B32B 7/02* | (2006.01) |
| *G02F 1/1343* | (2006.01) |
| *G02F 1/00* | (2006.01) |

(52) U.S. Cl.
CPC .............. *G02F 1/1337* (2013.01); *B32B 5/142* (2013.01); *B32B 7/02* (2013.01); *G02F 1/0045* (2013.01); *G02F 1/134363* (2013.01); *B32B 2307/204* (2013.01); *B32B 2307/412* (2013.01)

(58) Field of Classification Search
CPC ................. G02F 1/1393; G02F 1/1337; G02F 1/134363; G02F 1/0045; B32B 5/142; B32B 7/02; B32B 2307/204; B32B 2307/412
USPC .................................................. 349/123–129
See application file for complete search history.

(56) References Cited

U.S. PATENT DOCUMENTS

| | | | | |
|---|---|---|---|---|
| 2001/0048498 | A1* | 12/2001 | Tomioka et al. | 349/123 |
| 2003/0151710 | A1* | 8/2003 | Tanaka et al. | 349/123 |
| 2007/0070282 | A1 | 3/2007 | Shibahara et al. | |
| 2012/0176575 | A1* | 7/2012 | Matsumoto et al. | 349/124 |

FOREIGN PATENT DOCUMENTS

JP       2007-86205       4/2007

* cited by examiner

*Primary Examiner* — Bumsuk Won
*Assistant Examiner* — Charles Chang
(74) *Attorney, Agent, or Firm* — Oblon, McClelland, Maier & Neustadt, L.L.P.

(57) ABSTRACT

According to one embodiment, a liquid crystal display apparatus includes an array substrate, a counter-substrate and a liquid crystal layer formed by a negative liquid crystal material. The array substrate includes a common electrode, an insulating film, pixel electrodes each including a slit and a first alignment film. The liquid crystal layer includes liquid crystal molecules which form a bias angle in a direction substantially orthogonal to a direction of extension of the slit and which are initially aligned. The first alignment film, the liquid crystal layer and the bias angle have a relationship of $-1.11 \geq -0.0353 \times C\_PI / C\_LC - 0.0523 \times \theta$.

2 Claims, 4 Drawing Sheets

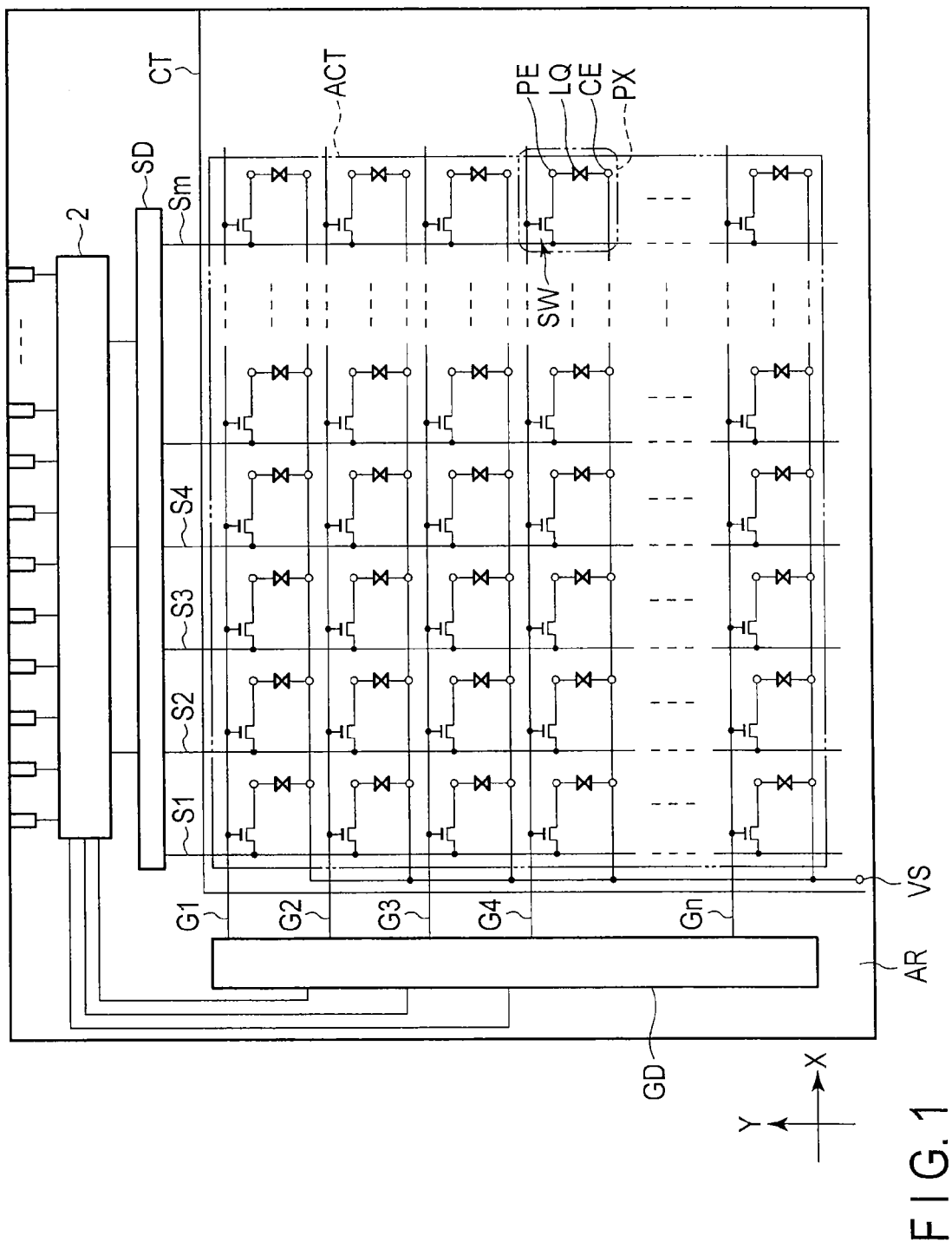
F I G. 1

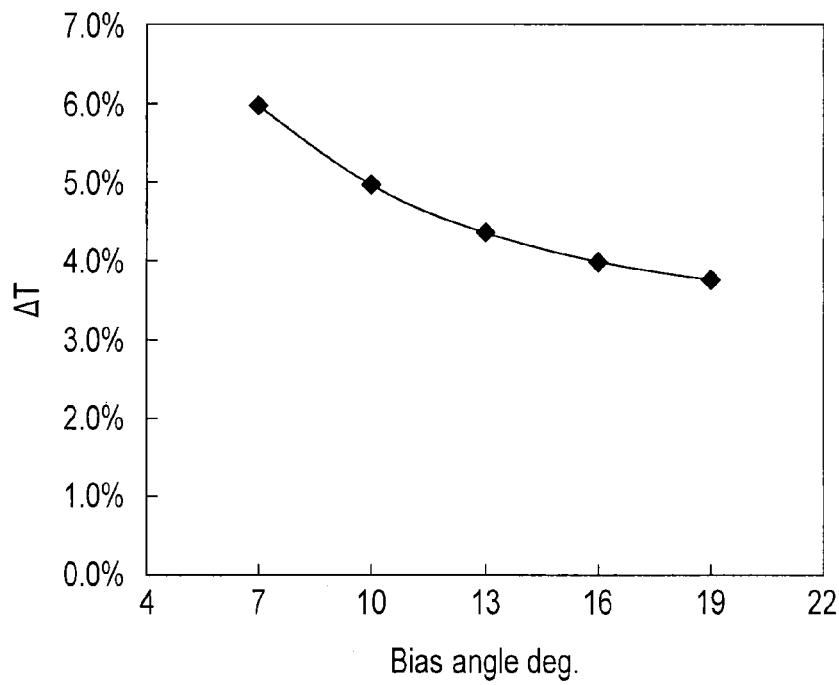
F I G. 6
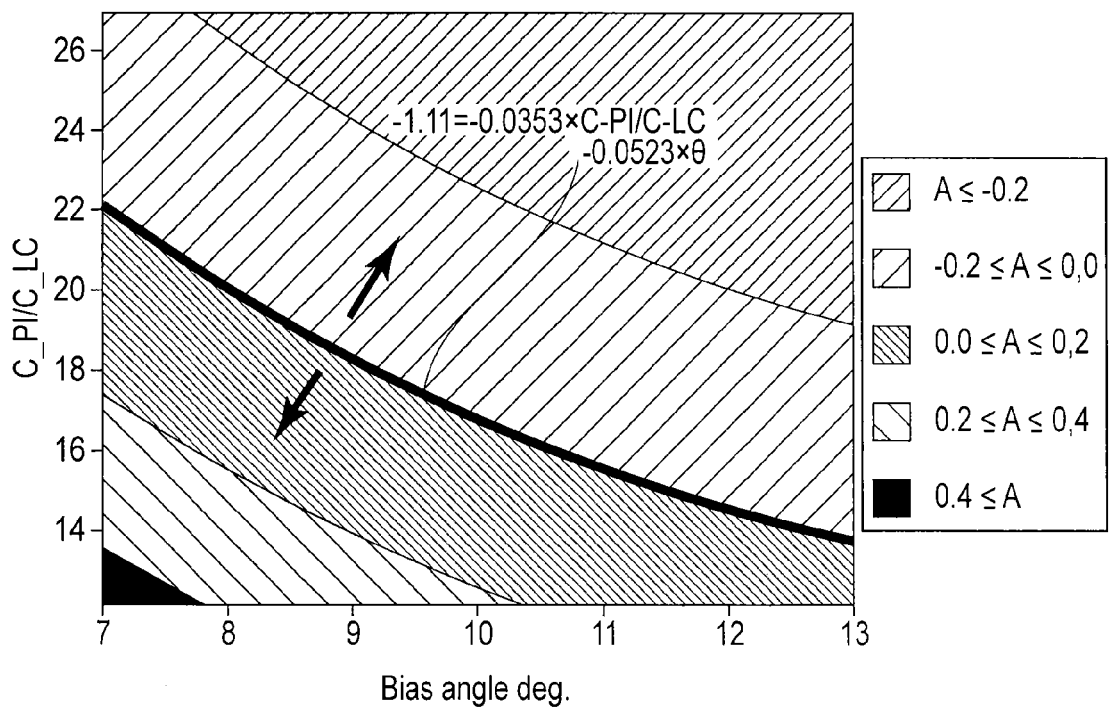
F I G. 7

LIQUID CRYSTAL DISPLAY APPARATUS

CROSS-REFERENCE TO RELATED APPLICATIONS

This application is based upon and claims the benefit of priority from Japanese Patent Application No. 2013-024336, filed Feb. 12, 2013, the entire contents of which are incorporated herein by reference.

FIELD

Embodiments described herein relate generally to a liquid crystal display apparatus.

BACKGROUND

Recently, flat display apparatuses have been remarkably developed and, especially, liquid crystal display apparatuses have been noticed in view of benefits such as light weight, thin shape, and low power consumption. In particular, a structure using a lateral electric field (and a fringe electric field) of In-Plane Switching (IPS) mode, Fringe Field Switching (FFS) mode, etc., in active matrix type liquid crystal display apparatuses including switching elements embedded in respective pixels, has been noticed. Each of the liquid crystal display apparatuses in such a lateral electric field mode comprises pixel electrodes and counter-electrodes provided on an array substrate, and switches liquid crystal molecules in a lateral electric field substantially parallel to a main surface of the array substrate.

BRIEF DESCRIPTION OF THE DRAWINGS

FIG. 1 schematically shows a structure and an equivalent circuit of a liquid crystal display apparatus according to an embodiment;

FIG. 6 shows an example of bias angle dependency of light transmittance variation, obtained when a thickness of an alignment film is varied by 5 nm, in an FFS-mode liquid crystal display apparatus employing negative liquid crystal; and FIG. 7 shows an example of an evaluation result of non-uniformity in display, obtained when a bias angle and alignment film capacitance/liquid crystal capacitance are varied, in an FFS-mode liquid crystal display apparatus employing negative liquid crystal.

DETAILED DESCRIPTION

Figure 2:
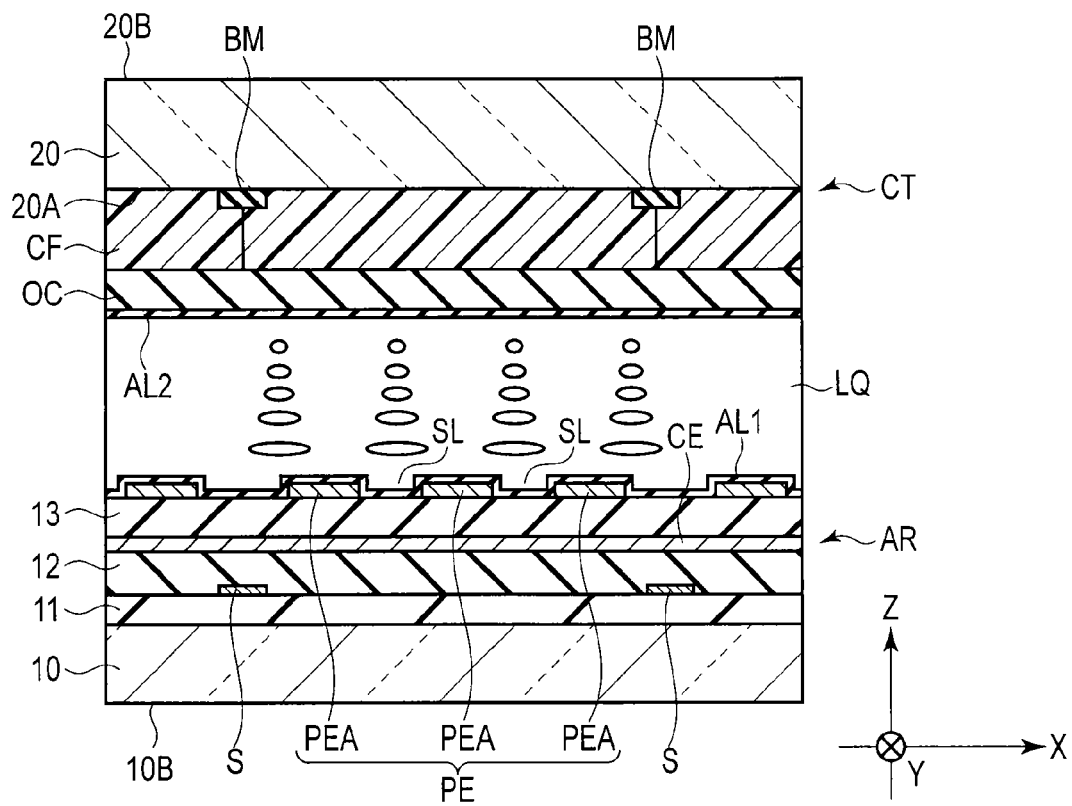
FIG. 2 schematically shows an example of a cross section in an active area of a liquid crystal display panel shown in FIG. 1.

In general, according to one embodiment, there is provided a liquid crystal display apparatus, comprising: an array substrate comprising a common electrode, an insulating film disposed on the common electrode, a plurality of pixel electrodes each disposed on the insulating film to be opposite to the common electrode and including a slit, and a first alignment film covering the insulating film and the pixel electrodes; a counter-substrate comprising a second alignment film arranged opposite to the first alignment film; and a liquid crystal layer held between the array substrate and the counter-substrate, and formed by a negative liquid crystal material. The liquid crystal layer comprises liquid crystal molecules which form a bias angle in a direction substantially orthogonal to a direction of extension of the slit and which are initially aligned. The first alignment film, the liquid crystal layer and the bias angle have a relationship of $$-1.11 \geq -0.0353 \times C\_PI/C\_LC - 0.0523 \times \theta.$$

where a capacitance of the first alignment film is C_PI, a capacitance of the liquid crystal layer is C_LC, and the bias angle is $\theta$.

According to another embodiment, there is provided a liquid crystal display apparatus, comprising: an array substrate comprising a common electrode, an insulating film disposed on the common electrode, a plurality of pixel electrodes each disposed on the insulating film to be opposite to the common electrode and including a slit, and a first alignment film covering the insulating film and the pixel electrodes; a counter-substrate comprising a second alignment film arranged opposite to the first alignment film; and a liquid crystal layer held between the array substrate and the counter-substrate. The liquid crystal layer comprises liquid crystal molecules which form a bias angle in a direction substantially orthogonal to a direction of extension of the slit and which are initially aligned. The first alignment film, the liquid crystal layer and the bias angle have a relationship of $$-1.11 \geq -0.0353 \times C\_PI/C\_LC - 0.0523 \times \theta.$$

where a capacitance of the first alignment film is C_PI, a capacitance of the liquid crystal layer is C_LC, and the bias angle is $\theta$.

The liquid crystal display apparatus of one of embodiments will be hereinafter described with reference to the accompanying drawings.

FIG. 1 schematically shows an equivalent circuit and a structure of a liquid crystal display apparatus according to the embodiment.

The liquid crystal display apparatus comprises an active matrix type liquid crystal display panel LPN. The liquid crystal display panel LPN comprises an array substrate AR which is a first substrate, a counter-substrate CT which is a second substrate arranged to be opposite to the array substrate AR, and a liquid crystal layer LQ held between the array substrate AR and the counter-substrate CT. The liquid crystal display panel LPN comprises an active area ACT in which an image is displayed. The active area ACT is composed of a plurality of pixels PX arrayed in m×n matrix (where each of m and n is a positive integer).

The liquid crystal display panel LPN comprises n gate lines G (G1 to Gn), m source lines S (S1 to Sm), etc. in the active area ACT. The gate lines G are extended, for example, approximately linearly along first direction X. The gate lines G are alternately arranged parallel along second direction Y intersecting the first direction X. The first direction X and the second direction Y are substantially orthogonal to each other. The source lines S intersect the gate lines G. The source lines S are extended approximately linearly along the second direction Y. The gate lines G and the source lines S may not be extended linearly, but may be curved partially.

Each of the gate lines G is extended to an outside of the active area ACT and is connected to a gate driver GD. Each of the source lines S is extended to an outside of the active area ACT and is connected to a source driver SD. At least some sections of the source driver GD and the source driver SD are, for example, provided on the array substrate AR and are connected with a controller-embedded drive IC chip 2.

Each of the pixels PX comprises a switching element SW, a pixel electrode PE, a common electrode CE, etc.

In the liquid crystal display panel LPN of the present embodiment, the pixel electrode PE and the common electrode CE are provided on the array substrate AR, and liquid crystal molecules of a liquid crystal layer LQ are switched by mainly using an electric field formed between the pixel electrode PE and the common electrode CE. The electric field formed between the pixel electrode PE and the common electrode CE is an oblique electric field which slightly tilts to an X-Y plane defined by the first direction X and the second direction Y or a main surface of the substrate (or a lateral field substantially parallel to the main surface of the substrate).

The switching element SW is constituted by, for example, an n-channel thin film transistor (TFT). The switching element SW is electrically connected with the gate lines G and the source lines S. The switching element SW may be in a top-gate type or a bottom-gate type. The semiconductor layer of the switching element SW is formed of, for example, polysilicon but may be formed of amorphous silicon.

The pixel electrode PE is arranged in each of the pixels PX, and is electrically connected to the switching element SW. The common electrode CE is arranged commonly for the pixel electrode PE in each of a plurality of pixels PX via an insulating layer. The pixel electrode PE and the common electrode CE are formed of, for example, conductive materials having an optical transmission property such as Indium Tin Oxide (ITO) and Indium Zinc Oxide (IZO).

The array substrate AR comprises a feeding module VS configured to apply a voltage to the common electrode CE. The feeding module VS is formed, for example, outside the active area ACT. The common electrode CE is extended to the outside of the active area ACT and is electrically connected with the feeding module VS.

FIG. 2 schematically shows an example of a cross section of the active area of the liquid crystal display panel shown in FIG. 1.

The array substrate AR is formed by using a first insulating substrate 10 having a light transmission property. The source lines S are provided on a first interlayer insulating film 11 and is covered with a second interlayer insulating film 12. The second interlayer insulating film 12 is a planarizing film, which is a transparent organic insulating film, in the present embodiment. Gate lines and storage capacitance lines (not shown) are arranged, for example, between the first insulating substrate 10 and the first interlayer insulating film 11. The common electrode CE is provided on the second interlayer insulating film 12, and is covered with a third interlayer insulating film 13. The third interlayer insulating film 13 is provided on the common electrode CE to cover the common electrode CE. The pixel electrode PE is provided on the third interlayer insulating film 13 to be opposite to the common electrode CE. Slits SL extending in, for example, second direction Y are formed on the pixel electrode PE. The pixel electrode PE comprises a plurality of electrode portions PEA separated from each other by the slits SL. The plurality of electrode portions PEA are also extended in the second direction Y. The common electrode CE is opposite to the pixel electrodes PE through the third interlayer insulating film 13.

A first alignment film AL1 is arranged on a plane opposite to the counter-substrate CT of the array substrate AR and extends over a substantially entire body of the active area ACT. The first alignment film AL1 covers the third interlayer insulating film 13, the pixel electrodes PE, etc. and is also arranged on the second interlayer insulating film 12. The first alignment film AL1 is formed of a material having a horizontal alignment property.

The counter-substrate CT is formed by using a second insulating substrate 20 having the light transmission property. The counter-substrate CT comprises black matrix BM, color filter CF, an overcoat layer OC, a second alignment film AL2, etc.

The black matrix BM partition each of the pixels PX and form an opening AP which is opposite to the pixel electrode PE. The black matrix BM is arranged to be opposite to wiring portions such as the source lines S, the gate lines, and the switching elements. Portions of the black matrix BM extending along the second direction Y alone are shown in the figure, but the black matrix BM may comprise portions extending along the first direction X. The black matrix BM is arranged on an inner surface 20A opposite to the array substrate AR of the second insulating substrate 20.

The color filter CF is arranged to correspond to the respective pixels PX. In other words, the color filter CF is arranged at the opening AP in the inner surface 20A of the second insulating film 20, and are partially overlaid on the black matrix BM. The color filter CF comprises a plurality of colored layers. The colored layers arranged on the respective pixels PX adjacent to the first direction X are different in color from each other. For example, the colored layers are formed of resin materials colored in three primary colors of light, i.e., red, blue and green. A red colored layer CFR formed of the resin material colored in red is arranged to correspond to a red pixel. A blue colored layer CFB formed of the resin material colored in blue is arranged to correspond to a blue pixel. A green colored layer CFG formed of the resin material colored in green is arranged to correspond to a green pixel. Boundaries of the colored layers are positioned to overlap the black matrix BM.

The overcoat layer OC covers the color filter CF. The overcoat layer OC relaxes an influence of roughness on surface of the color filter CF.

The second alignment film AL2 is arranged on the surface of the counter-substrate CT which is opposite to the array substrate AR, and is extended over a substantially entire surface of the active area ACT. The second alignment film AL2 covers the overcoat layer OC, etc. The second alignment film AL2 is formed of a material having a horizontal alignment property.

The first alignment film AL1 and the second alignment film AL2 are subjected to alignment treatment (for example, rubbing treatment or light alignment treatment) to initially align the liquid crystal molecules of the liquid crystal layer LQ in a predetermined direction. A state in which the voltage is not applied to the liquid crystal layer LQ, i.e., a state (OFF time) in which a potential difference (or electric field) is not formed between the pixel electrode PE and the common electrode CE corresponds to the initial alignment state, and an alignment direction of the liquid crystal molecules LM at the OFF time corresponds to the initial alignment direction.

The array substrate AR and the counter-substrate CT are arranged such that the first alignment film AL1 and the second alignment film AL2 of the respective substrates are opposite to each other. At this time, for example, columnar spacers (not shown) formed of a resin material, integrally with either of the substrates, are arranged between the array substrate AR and the counter-substrate CT. A predetermined cell gap is thereby formed. The array substrate AR and the counter-substrate CT are bonded to each other by a sealing member (not shown) outside the active area ACT, in a state in which the predetermined cell gap is formed.

The liquid crystal layer LQ is held in the cell gap formed between the array substrate AR and the counter-substrate CT, and is arranged between the first alignment film AL1 and the second alignment film AL2. The liquid crystal layer LQ is composed of a liquid crystal material having a negative dielectric anisotropy.

A first optical element (not shown) is bonded on an outer surface of the array substrate AR, i.e., an outer surface 10B of the first insulating substrate 10 constituting the array substrate AR, by an adhesive, etc. The first optical element is positioned at a side opposite to a backlight unit (not shown) of the liquid crystal display panel LPN, and is configured to control a polarized state of light incident on the liquid crystal display panel LPN from the backlight unit. The first optical element includes a first polarizer (not shown) having a first polarization axis (or a first absorption axis).

A second optical element (not shown) is bonded on an outer surface of the counter-substrate CT, i.e., an outer surface 20B of the second insulating substrate 20 constituting the counter-substrate CT, by an adhesive, etc. The second optical element is positioned at a side of a display surface of the liquid crystal display panel LPN, and is configured to control a polarized state of light emitted from the liquid crystal display panel LPN. The second optical element includes a second polarizer (not shown) having a second polarization axis (or a second absorption axis).

The first polarization axis of the first polarizer and the second polarization axis of the second polarizer have a positional relationship (cross-Nicol) of being, for example, orthogonal to each other. At this time, for example, either of the polarizers is arranged such that the polarization axis of the polarizer is parallel or orthogonal to the initial alignment direction of the liquid crystal molecules, i.e., the first alignment treatment direction or the second alignment treatment direction.

Figure 3:
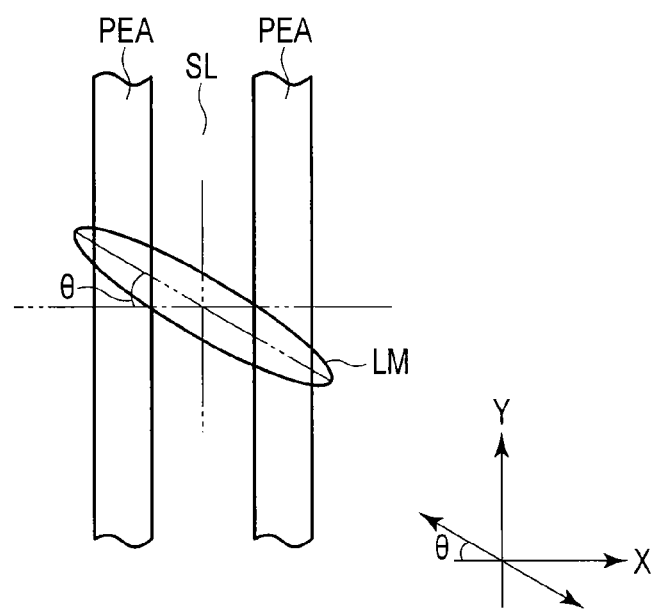
FIG. 3 shows an example of a relationship between an electrode portion of a pixel electrode and an initial alignment direction of liquid crystal molecules.

FIG. 3 shows an example of a relationship between the electrode portions PEA of the pixel electrode PE and an initial alignment direction of the liquid crystal molecules LM.

The initial alignment direction of the liquid crystal molecules LM is a direction tilted to a direction substantially orthogonal to the direction of extension of the slits SL or the direction of extension of the electrode portions PEA. An angle (bias angle) θ formed between the initial alignment direction and the direction tilted to the direction substantially orthogonal to the direction of extension of the slits SL or the direction of extension of the electrode portions PEA, is defined by the alignment treatment direction of the first alignment film AL1 and the alignment treatment direction of the second alignment film AL2. The bias angle θ is set to be, for example, a predetermined angle to prevent a reverse domain from occurring in the liquid crystal layer LQ.

In the liquid crystal display apparatus, the liquid crystal molecules LM of the liquid crystal layer LQ are aligned such that a longer axis of the molecules is directed to the first alignment treatment direction of the first alignment film AL1 and the second alignment treatment direction of the second alignment film AL2, in the state in which the voltage is not applied to the liquid crystal layer LQ, i.e., the state (OFF time) in which a potential difference (or an electric field) is not formed between the pixel electrode PE and the common electrode CE. The OFF time corresponds to the initial alignment state, and the alignment direction of the liquid crystal molecules LM at the OFF time corresponds to the initial alignment direction.

Part of backlight from a backlight unit 4 passes through a first polarizer PL1 and is made incident on the liquid crystal display panel LPN. A polarized state of the light incident on the liquid crystal display panel LPN is varied depending on the aligned state of the liquid crystal molecules LM when the light passes through the liquid crystal layer LQ. At the OFF time, the light passing through the liquid crystal layer LQ is absorbed into a second polarizer PL2 (black display).

On the other hand, a lateral electric field (or an oblique electric field) substantially parallel to the substrate is formed between the pixel electrode PE and the common electrode CE, in a state in which the voltage is applied to the liquid crystal layer LQ, i.e., a state (ON time) in which a potential difference (or an electric field) is formed between the pixel electrode PE and the common electrode CE. The liquid crystal molecules LM are influenced by the electric field and are rotated in a plane substantially parallel to plane X-Y.

At the ON time, part of the backlight incident on the liquid crystal display panel LPN from the backlight unit 4 passes through the first polarizer PL1 and is made incident on the liquid crystal display panel LPN. A polarized state of the backlight incident on the liquid crystal layer LQ is varied. At the ON time, at least part of the light passing through the liquid crystal layer LQ passes through the second polarizer PL2 (white display).

In a liquid crystal display apparatus employing the positive liquid crystal, a director of the liquid crystal molecules LM tends to be deformed in cell gap direction Z, by a longitudinal electric field component generated between the pixel electrode PE and the common electrode CE, and between the pixel electrode PE/common electrode CE and the counter-substrate CT, and the reverse domain may occur by application of the high voltage or by pressing even if a predetermined bias angle is set. On the other hand, in a liquid crystal display apparatus employing the negative liquid crystal, a desirable result on the reverse domain can be obtained from the positive liquid crystal since the director of the liquid crystal molecules LM is not substantially deformed in the cell gap direction Z, by the longitudinal electric field component generated between the pixel electrode PE and the common electrode CE.

Figure 4:
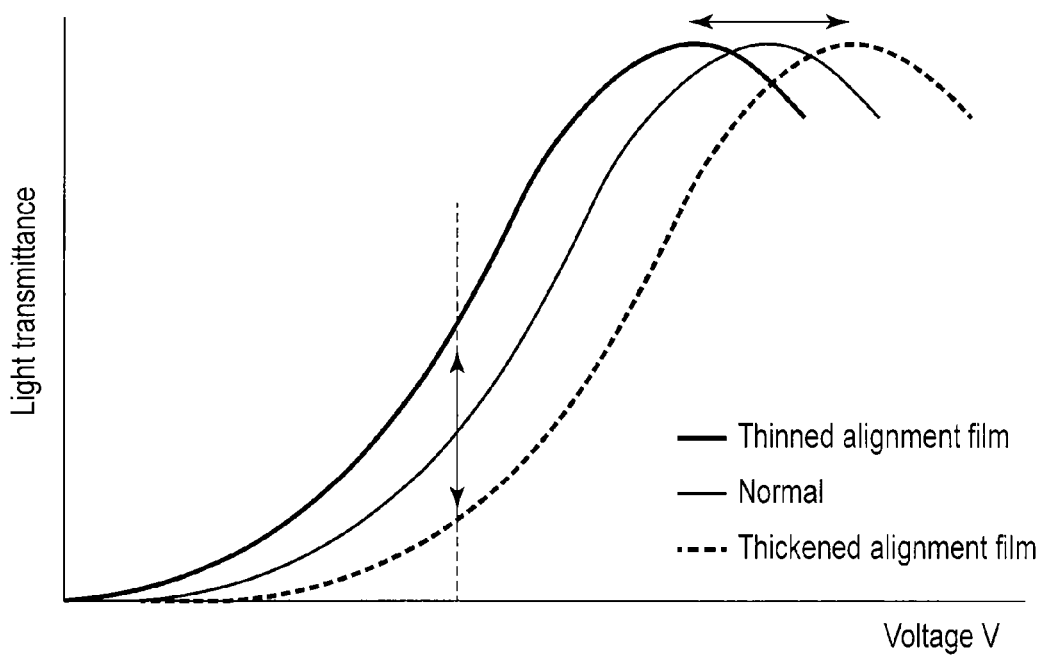
FIG. 4 shows an example of a property of light transmittance to a voltage, obtained when a thickness of an alignment film is varied, in a liquid crystal display apparatus employing negative liquid crystal.

FIG. 4 shows an example of a property of light transmittance to the voltage, obtained when the thickness of the alignment film is varied, in the liquid crystal display apparatus employing the negative liquid crystal.

The non-uniformity in thickness of the alignment films AL1 and AL2 influences the light transmittance of the liquid crystal display apparatus. In an FFS-mode liquid crystal display apparatus, the light transmittance of the liquid crystal display apparatus is influenced by the non-uniformity of thickness of the first alignment film AL1. More specifically, when the same voltage is applied to the liquid crystal layer LQ, the light transmittance becomes high if the first alignment film AL1 is thinned, and the light transmittance becomes low if the first alignment film AL1 is thickened. In other words, when the same light transmittance is obtained, the voltage applied to the liquid crystal layer LQ becomes smaller as the first alignment film AL1 is thinner. Thus, if non-uniformity occurs in the thickness of the first alignment film AL1 in the active area ACT, non-uniformity in display is caused since the light transmittance of the liquid crystal depends on the thickness of the first alignment film AL1.

Figure 5:
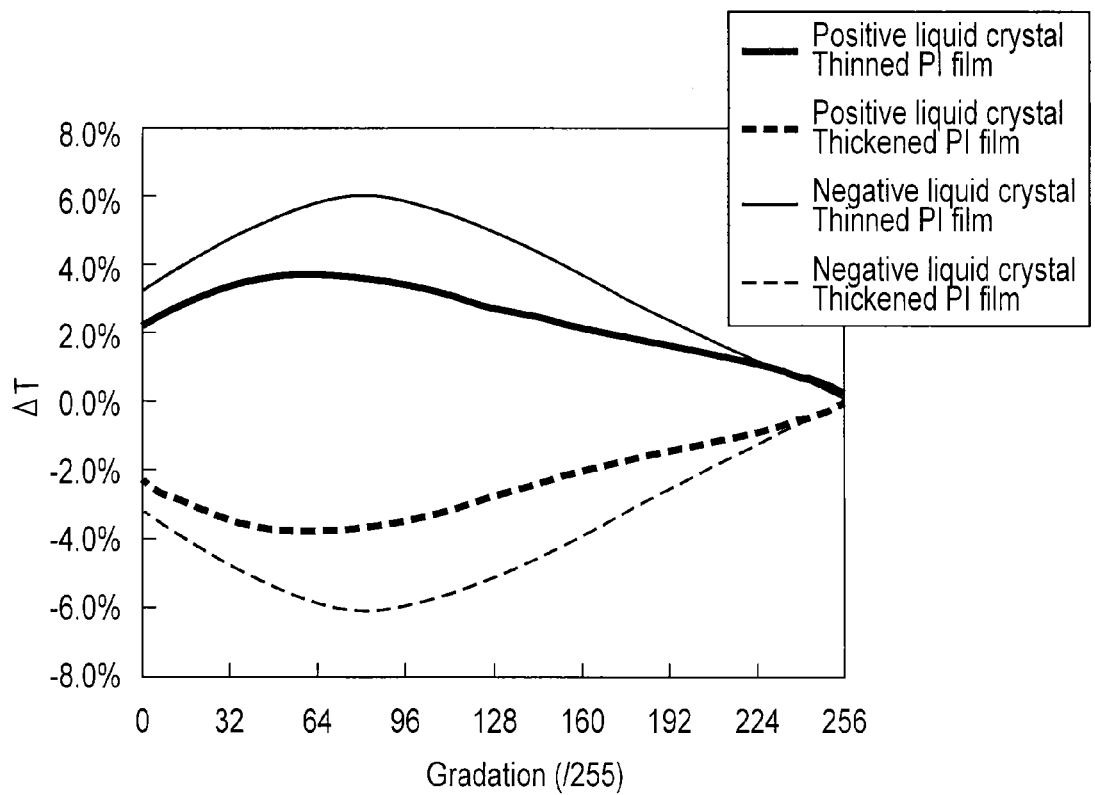
FIG. 5 shows an example of variation in light transmittance of each gradation, obtained when a thickness of an alignment film is varied, in a liquid crystal display apparatus employing negative liquid crystal and a liquid crystal display apparatus employing positive liquid crystal.

FIG. 5 shows an example of variation in the light transmittance of each gradation, obtained when the thickness of the alignment film is varied, in the liquid crystal display apparatus employing the negative liquid crystal and the liquid crystal display apparatus employing the positive liquid crystal. The figure shows a variation in the light transmittance obtained when the alignment film is thinned and a variation in the light transmittance obtained when the alignment film is thickened, with reference to the light transmittance obtained when the thickness of the alignment film is not varied.

The sensitivity to the thickness of the first alignment film AL1 is varied in, for example, a liquid crystal display apparatus employing the liquid crystal having a positive dielectric anisotropy, and a liquid crystal display apparatus employing the liquid crystal having a negative dielectric anisotropy. More specifically, when the liquid crystal having the negative dielectric anisotropy is employed, the sensitivity to the thickness of the first alignment film AL1 tends to be higher and the non-uniformity in display tends to occur as compared with a case where the liquid crystal having the positive dielectric anisotropy is employed.

FIG. 6 shows an example of bias angle dependency of light transmittance variation, obtained when the thickness of the alignment film is varied by 5 nm, in the FFS-mode liquid crystal display apparatus employing the negative liquid crystal.

In this example, when the thickness of the first alignment film AL1 is varied, the variation ($\Delta T$) in the light transmittance becomes smaller as the bias angle is greater.

The present inventors have noticed the above-described matter and found that the non-uniformity in display caused by the non-uniformity in thickness of the first alignment film AL1 can be suppressed by appropriately setting capacitance C_PI of the first alignment film AL1, liquid crystal capacitance C_LC, and bias angle $\theta$, in the liquid crystal display apparatus employing the negative liquid crystal.

FIG. 7 shows an example of an evaluation result of the non-uniformity in display, obtained when the bias angle and the alignment film capacitance/liquid crystal capacitance are varied, in the FFS-mode liquid crystal display apparatus employing the negative liquid crystal.

An evaluation result is obtained that in a general negative liquid crystal and alignment film, i.e., when the bias angle $\theta$ is set at 10°, the non-uniformity in display caused by the light transmittance variation caused by the non-uniformity (for example, ±5 nm) in the alignment film is acceptable. Thus, this example indicates the light transmittance variation (=A) obtained when the alignment film capacitance/liquid crystal capacitance and the bias angle $\theta$ are varied, in the liquid crystal display apparatus employing the general negative liquid crystal and alignment film, in a shape of contour lines, within a range of the transmittance variation, with reference to the light transmittance variation (A=0) based on the variation in the alignment film obtained in a general negative liquid crystal and alignment film, i.e., when the bias angle $\theta$ is set at 10 degrees. Thus, the non-uniformity in display is more suppressed as the variation in the light transmittance (=A) is smaller.

In this example, a condition that the variation in the light transmittance used as the criterion is smaller than the criterion (A=0) and a preferable display quality can be obtained by suppressing the non-uniformity in display is $-1.11 \geq -0.0353 \times C\_PI/C\_LC - 0.0523 \times \theta$. Therefore, the non-uniformity in display can be suppressed by setting the bias angle $\theta$ and the alignment film capacitance CPI/liquid crystal capacitance C_LC to meet $-1.11 \geq -0.0353 \times C\_PI/C\_LC - 0.0523 \times \theta$.

The alignment film capacitance CPI can be calculated from C_PI=e_PI/d_PI where e_PI is a dielectric constant of the first alignment film AL1 and d_PI is the thickness of the first alignment film AL1. The thickness of the first alignment film AL1 is a width in third direction Z, of the first alignment film AL1 applied in a flat region.

The liquid crystal capacitance C_LC can be calculated from C_LC=e⊥/d_LC where e⊥ is a dielectric constant of the liquid crystal layer LQ vertical to a longer axis direction of the liquid crystal molecules LM and d_LC is the thickness of the liquid crystal layer LQ. The thickness of the liquid crystal layer LQ is, for example, a width in the third direction Z, of the liquid crystal layer LQ held between the first alignment film AL1 and the second alignment film AL2, on the pixel electrode PE. In the present embodiment, the longer axis direction of the liquid crystal molecules LM is a direction which forms the bias angle $\theta$ with a direction substantially orthogonal to the direction of extension of the slits SL or the direction of extension of the electrode portions PEA.

In the liquid crystal display apparatus, the dielectric constant and the thickness of the first alignment film AL1 are set, and the dielectric constant in the direction ⊥ to the longer axis direction of the liquid crystal molecules and the thickness of the liquid crystal layer are set, based on the above results, so as to meet $-1.11 \geq -0.0353 \times C\_PI/C\_LC - 0.0523 \times \theta$. Therefore, according to the present embodiment, the non-uniformity in display depending on the non-uniformity in thickness of the first alignment film AL1 can be suppressed, and the liquid crystal display apparatus having a preferable display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus, comprising:
    an array substrate comprising a common electrode, an insulating film disposed on the common electrode, a plurality of pixel electrodes each disposed on the insulating film to be opposite to the common electrode and including a slit, and a first alignment film covering the insulating film and the pixel electrodes;
    a counter-substrate comprising a second alignment film arranged opposite to the first alignment film; and
    a liquid crystal layer held between the array substrate and the counter-substrate, and formed by a negative liquid crystal material,
    wherein
    the liquid crystal layer comprises liquid crystal molecules which form a bias angle in a direction substantially orthogonal to a direction of extension of the slit and which are initially aligned, and
    the first alignment film, the liquid crystal layer and the bias angle have a relationship of $$-1.11 \geq -0.0353 \times C\_PI/C\_LC - 0.0523 \times \theta$$

where a capacitance of the first alignment film is C_PI, a capacitance of the liquid crystal layer is C_LC, and the bias angle is $\theta$,
        the capacitance of the first alignment film is a value obtained by dividing a dielectric constant of the first alignment film by a thickness of the first alignment film, and the capacitance of the liquid crystal layer is a value obtained by dividing a specific dielectric constant of the liquid crystal layer in a direction vertical to a longer axis of the liquid crystal molecules by a thickness of the liquid crystal layer.

2. A liquid crystal display apparatus, comprising:

an array substrate comprising a common electrode, an insulating film disposed on the common electrode, a plurality of pixel electrodes each disposed on the insulating film to be opposite to the common electrode and including a slit, and a first alignment film covering the insulating film and the pixel electrodes;

a counter-substrate comprising a second alignment film arranged opposite to the first alignment film; and a liquid crystal layer held between the array substrate and the counter-substrate, wherein the liquid crystal layer comprises liquid crystal molecules which form a bias angle in a direction substantially orthogonal to a direction of extension of the slit and which are initially aligned, and the first alignment film, the liquid crystal layer and the bias angle have a relationship of $$-1.11 \geq -0.0353 \times C\_PI/C\_LC - 0.0523 \times \theta$$

where a capacitance of the first alignment film is $C\_PI$, a capacitance of the liquid crystal layer is $C\_LC$, and the bias angle is $\theta$, the capacitance of the first alignment film is a value obtained by dividing a dielectric constant of the first alignment film by a thickness of the first alignment film, and the capacitance of the liquid crystal layer is a value obtained by dividing a specific dielectric constant of the liquid crystal layer in a direction vertical to a longer axis of the liquid crystal molecules by a thickness of the liquid crystal layer.

* * * * *